United States Patent [19]

Madwed

[11] 4,373,573
[45] Feb. 15, 1983

[54] LONG TERM STORAGE AND USE OF SOLAR ENERGY

[76] Inventor: Albert Madwed, 25 Saxton Dr., Bridgeport, Conn. 06604

[21] Appl. No.: 146,125

[22] Filed: May 2, 1980

[51] Int. Cl.³ .......................... F25B 13/00; F24J 3/02
[52] U.S. Cl. .......................................... 165/2; 165/18; 165/45; 165/48 S; 126/429; 126/430; 126/452; 98/65
[58] Field of Search ...................... 165/2, 18, 45, 48 S; 98/65; 126/428, 429, 430, 432, 436, 452, 400, 422, 437; 62/260

[56] References Cited

U.S. PATENT DOCUMENTS

| | | | |
|---|---|---|---|
| 3,262,493 | 7/1966 | Hervey | 165/18 |
| 3,894,345 | 7/1975 | Zeltmann | 34/93 |
| 4,173,304 | 11/1979 | Johnson | 126/400 X |
| 4,201,192 | 5/1980 | Coxon et al. | 126/422 |
| 4,213,447 | 7/1980 | Erickson | 126/429 |
| 4,244,519 | 1/1981 | Zornig et al. | 126/430 |
| 4,253,801 | 3/1981 | O'Hare | 165/45 X |

*Primary Examiner*—Samuel Scott
*Assistant Examiner*—Margaret A. Focarino
*Attorney, Agent, or Firm*—Hubbell, Cohen, Stiefel & Gross

[57] ABSTRACT

A method and system for the passive solar energy induced storage and use of thermal energy at both high and low temperatures, comprising a collector (76,110) communicating with the atmosphere for collecting air acting as a carrier for thermal energy, an underground thermal storage reservoir (78,112) having a capacity sufficient to store thermal energy for substantially an entire heating or cooling season, and a solar chimney (82) providing convection means for at least in part inducing the natural circulation of air from the atmosphere into the collector into and through the thermal storage reservoir, and outwardly from the reservoir back into the atmosphere, to transfer thermal energy between the collector (76,110) and the reservoir (78,112).

16 Claims, 7 Drawing Figures

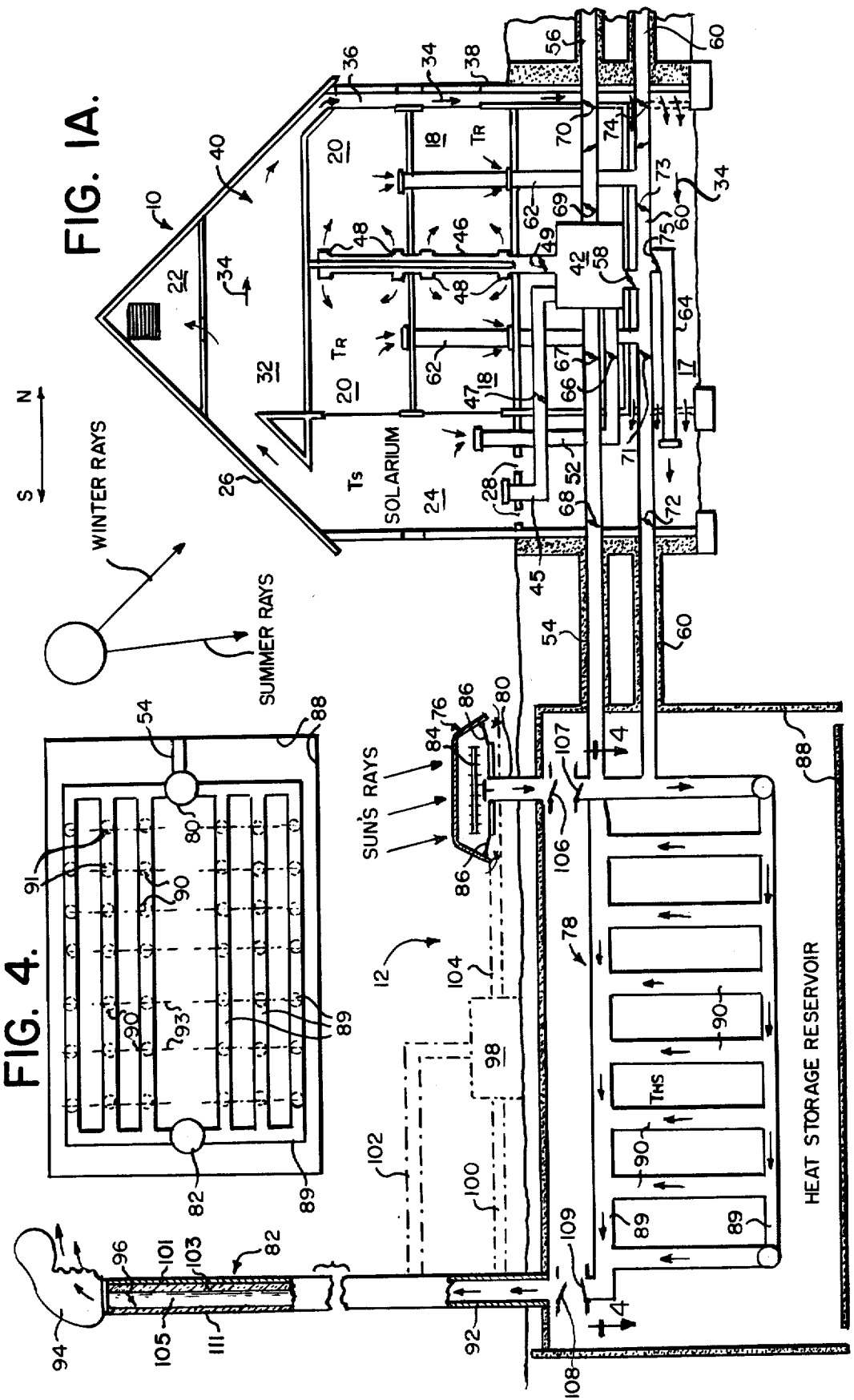

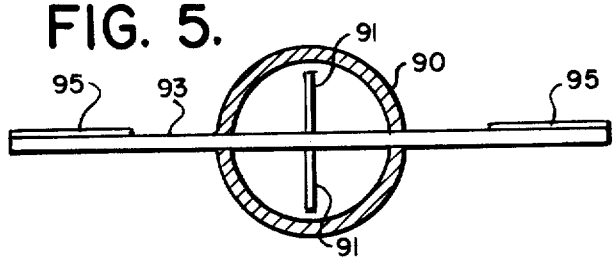
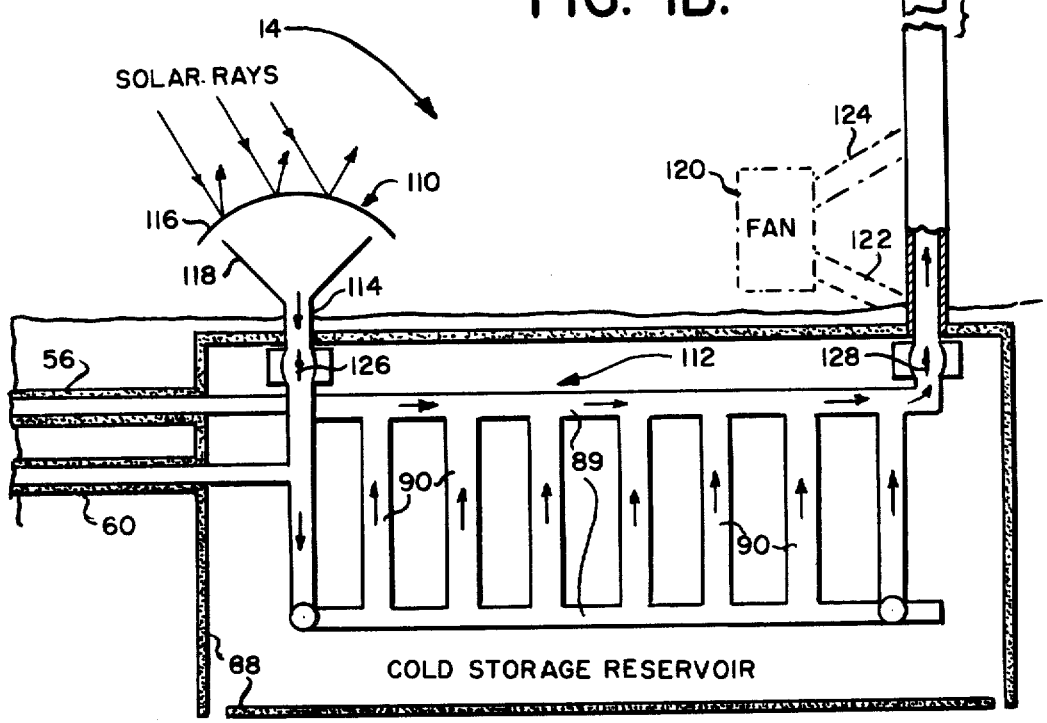
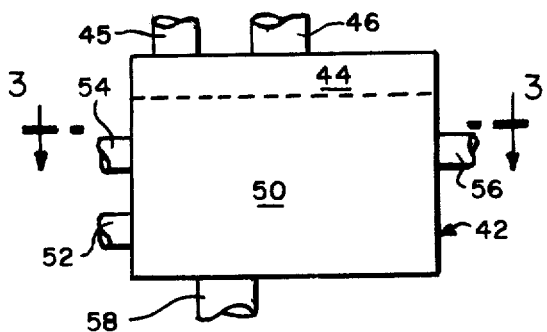
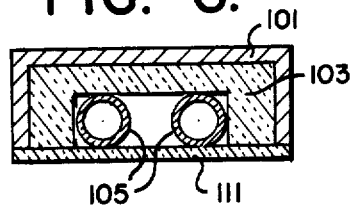
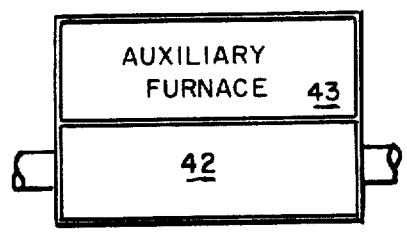

LONG TERM STORAGE AND USE OF SOLAR ENERGY

TECHNICAL FIELD

This invention relates to a method and system for the storage and use of solar energy, and more particularly to the long term storage and utilization of solar energy as, for example, in the seasonal heating and cooling of buildings. In one preferred form, the invention may embody a passive thermal storage system for collecting and storing solar energy over substantially an entire winter heating season or summer cooling season, and means for utilizing such energy to supply substantially all or most of the cooling or heating requirements of a house or other building during the ensuing summer or winter seasons, respectively.

BACKGROUND ART

Since the 1970's, the ever increasing cost of energy derived from fossil fuels has become of critical concern throughout the world. One consequence of the possible depletion of fossil fuel reserves and the increasing cost of energy produced therefrom has been heightened interest in the applications of solar energy, particularly as a means for space and hot water heating for buildings.

A myriad of solar heating methods and systems of both the "active" and "passive" types has heretofore been proposed. Of particular current interest are the large variety of passive solar heating designs in which the collection, storage and distribution of solar energy in a building or the like is effected by natural means, with but minimum use of relatively complex (and expensive) solar panels, pumps, fans and other auxiliary mechanical systems. Illustrative of some of the many passive solar heating systems described in the prior patent literature, for example, are those disclosed in Thomason U.S. Pat. Nos. 3,254,703 and 3,412,728; Hay U.S. Pat. No. 3,563,305; Nilsson U.S. Pat. No. 4,006,856; and Groth U.S. Pat. No. 4,029,258.

Prior solar heating systems provide only for the short-term storage of solar energy for no more than a few days at a time. In effect, such systems require fast, efficient energy recovery to facilitate use substantially concurrently with solar energy collection or, at the most, after storage of no more than a few days as, for instance, during periods of cloudy, rainy or snowy weather. Such systems are inadequate in many regions which experience long periods of overcast climatic conditions. Moreover, by their very nature they require the additional provision of complex and expensive auxiliary equipment, e.g., conventional heating and/or cooling systems, as supplemental energy sources. Accordingly, prior art solar heating systems have found only limited application to date.

The prior art systems all employ some form of short term energy storage such as a collection of stones or a pool of water. The use of the earth as a long term thermal storage reservoir has also been proposed, for example, in Werner U.S. Pat. Nos. 4,024,910 and 4,139,321; Wade U.S. Pat. No. 4,128,204; and Yuan U.S. Pat. No. 4,138,995. However, these proposals require the use of relatively complex ducts, channels and/or piping arrangements, or the provision of pumps for the active circulation, i.e. pumping, of heat transfer fluids to effect thermal energy storage within the underground reservoirs provided thereby. Moreover, the circulating fluid is also circulated to the thermal load in many of these instances whereby to reduce the availability for storage of thermal energy in the fluid. The Yuan device comprehends the use of plural heat transfer fluids, e.g., water ammonia, acetone, fluorocarbon refrigerants, alcohols or liquid metals, and plural, active or pumped systems for effecting heat exchange with the underground thermal storage zone thereof. Such prior art teachings thus necessitate the use of relatively complex "plumbing", and/or require "active" mechanical systems for thermal energy storage and distribution.

DISCLOSURE OF THE INVENTION

In accordance with the present invention, a thermal storage system for storing solar energy (high energy, e.g. heat, or low energy, e.g. cold) over long term periods is provided, which system comprises a collector for collecting air acting as a carrier for thermal energy. The collector may be in communication with the atmosphere in which event it will collect outside air, or in a closed circulation loop in which event it will collect recirculating air. The system further comprises an underground thermal storage reservoir having a capacity sufficient to store thermal energy for long periods of time, preferably for substantially an entire heating or cooling season of up to six months more or less, and an inlet means connecting the thermal storage reservoir with collector for transferring the air from the collector to the thermal storage reservoir. Circulation means, preferably passive, is provided for circulation of the air from the collector, into and through the thermal storage reservoir, and outwardly from the reservoir whereby to effect heat transfer from the collector to the reservoir during the storage cycle. Finally, outlet means for transferring thermal energy between the reservoir and a desired heat load is provided, together with suitable control means for at least at times isolating the reservoir from the heat load during a heating or cooling season to accumulate thermal energy (hot or cold) within the reservoir throughout such period, and for isolating the reservoir from the collector during at least some of the time during succeeding cooling or heating season, respectively, to thereby facilitate the transfer of thermal energy from the reservoir to the desired load during that period.

The method and system hereof comprehend the storage and use of both relatively high temperature thermal energy which is available from the hot air of summer that is preferably, although not necessarily, further heated by the solar heating of air to elevated temperatures which may be used for winter space heating purposes, and relatively low temperature thermal energy (e.g., that possessed by "cold" winter air at temperatures varying from about 0° to 40° F.) which may be used for summer cooling purposes. In popular parlance, and as used in part herein, the invention is thus applicable to the storage and distribution of both "heat" and "cold", i.e., to the accumulation and use of thermal energy at both relatively high and relatively low temperature levels to achieve any desired space heating or cooling function.

Employing the technique of the invention, the heat of the summer season may thus be stored within a heat storage reservoir in the earth with no or little expenditure of conventionally available energy to be used for heating purposes during the winter season. Conversely, the system takes the cold of the winter season and stores it within a cold storage reservoir within the earth with no or little expenditure of conventionally available energy to be used for cooling purposes during the summer season. The actual periods of alternate storage or use of "heat" or "cold" will of course vary, dependent upon the particular location at which the invention is utilized. When, for example, the invention is used at a situs in a temperate zone, e.g., at a latitude of about 40° (in the Northern Hemisphere), the "summer season" during which heat may be stored will generally encompass the period from spring through fall, e.g., from March to October; conversely, at such a latitude the "winter season", during which cold may be stored employing the invention, is likely to encompass the period from fall through spring, e.g., from about October to March. Accordingly, as used herein the terms "summer season" and "winter season" refer generally to the approximate six month periods during which heat may be stored and space cooling may be necessary, or during which cold may be stored and space heating may be necessary, employing the present invention.

While the reservoir may be employed to store all of the heat or cold required for the next cooling or heating season to render the load independent of climatic conditions during that season, it will be apparent, especially when the load is a passively heated solar house, that the amount of energy required to be stored to render the house substantially independent of fossil fuel is the amount representing the difference between the seasonal heating load, i.e. the gross energy requirements, and the amount which is available from conventional solar passive heating as may be used throughout the winter. In addition, the collector for the hot storage reservoir, which will be hereinafter described in detail, by virtue of its structure may also be able to pick up significant amounts of solar energy during the winter heating season. This energy, as will be more fully described hereinafter, may also be made available to the system in one mode of operation. This would, therefore, tend to further reduce the amount of energy necessary for storage in order to maintain the house at comfort level and yet render it independent of fossil fuel during the winter heating season.

As will become more apparent hereinafter, the reservoir, therefore, is preferably proportioned to be capable of storing high temperature thermal energy in sufficient quantity to make up the entire winter heating season deficit, i.e. the net energy requirement, that will be realized between the gross energy requirements of the house to maintain the temperature of the rooms in the house within the comfort level and the amount of high temperature solar energy gatherable by the system during the winter.

Of course, if, by virtue of the size of the land on which the load is located or by virtue of the excessive demand of the load, the reservoir cannot be proportioned practicably to meet such deficit, then it may be made smaller, within practical limits, in order to significantly reduce the dependence of the system on fossil fuel. At present, it would appear that the system will not be economical if the reservoir is proportioned to render it capable of storing less than a major portion of the net energy requirement of an entire heating or cooling season.

Therefore, hereinafter in discussing energy requirement, the minimum should be predicated on the net energy required which may be significantly less than the gross energy requirement of the load, since the load itself, or other portions of the system, may derive solar energy directly during the season that the reservoir is being tapped, whereby to reduce the energy drain on the reservoir and hance the necessary size thereof.

While circulation through a reservoir during its storage part of the cycle can be accomplished by a fan or blower, it is preferred that the circulation be induced in part, and most preferably entirely, by passive solar means which will induce convection flow through the reservoir either as an open loop system or a closed loop system. The passive, long term thermal storage method and system hereof may be employed for the space heating or cooling of any building structure, including apartment houses, public buildings such as schools, commercial buildings, or single or multiple dwelling houses. Alternatively, the invention may be utilized for hot water heating or as a source of refrigeration, or to operate a heat engine or to generate electricity, rather than for space heating or cooling. It is however presently preferred to employ the passive solar energy, thermal storage system of the invention for the alternate, seasonal heating and cooling of private houses or the like, as more fully described hereinafter.

BRIEF DESCRIPTION OF DRAWINGS

The details of the present invention are further described in connection with the accompanying drawing, in which:

FIGS. 1A and 1B, when placed side-by-side with FIG. 1A on the left, make up a diagrammatic cross-section through a solar energy storage and heating and cooling system embodying a preferred embodiment of the invention;

FIG. 2 is an enlarged cross-section of the blower system employed in the heating and cooling systems illustrated in FIGS. 1A and 1B;

FIG. 3 is a horizontal section through the blower system, taken along line 3—3 in FIG. 2;

FIG. 4 is a horizontal section, taken along line 4—4 in FIG. 1A, showing the underground heat storage reservoir utilized in the heating system illustrated; and FIG. 5 is an enlarged view of one of the conduits utilized to effect heat transfer with the heat storage reservoir.

FIG. 6 is a sectional view taken along line 6—6 in either FIG. 1A or 1B.

BEST MODE FOR CARRYING OUT THE INVENTION

Referring now to the drawings in detail and particularly to FIGS. 1A and 1B thereof, the system for storing and utilizing solar energy of the present invention is shown in combination with a load in the form of a house which is a preferred load for the system. Most preferably, the house is a passive solar heated house 10, although any type of building or other system load may be employed. In addition to house 10, the system includes heat storage system 12 (FIG. 1A), and cold storage system 14 (FIG. 1B). As described more fully below, passive solar energy means are employed in both the heat and cold storage systems for at least partially circulating thermal energy therethrough and thus storing the same in the earth. Active means, e.g., a blower system or the like, may then be utilized to circulate air through the house 10 and one or the other of the energy storage systems to effect heat exchange therewith and to effect space heating or cooling of the house, as may be appropriate, although this too may be done wholly or partly passively, i.e. as by convection. Either or both such thermal storage systems may be provided in conjunction with house 10, depending upon climatic or terrain conditions, the availability of space, economic factors or the like.

In the preferred embodiment illustrated in FIGS. 1A and 1B, both heat storage system 12 and cold storage system 14 are associated with the passive solar house 10. The heat storage system 12 is preferably, although not necessarily, disposed generally south of house 10, with cold storage system 14 generally north thereof. Clearly, the nature of the building lot may be an overriding consideration in such location. As is recognized in the solar heating art, optimum solar heating is obtained (in the Northern Hemisphere) when the collector element of the heating system is oriented due south. On the other hand, the solar collector may be displaced up to ±15° from due south with a loss of no more than about 2% efficiency from the maximum solar heating effect.

I

Design of the Passive Solar Heated House

While the heat and cold storage systems 12 and 14 may be employed for space heating and cooling of a wide variety of buildings, or for other energy loads such as hot or cold storage compartments, hot water heaters, engines or the like, they are preferably utilized with passive solar heated house designs generally of the nature of that depicted in the drawing. As shown for purposes of illustration, house 10 incorporates a basement space level 16, a pair of rooms 18 defining a first floor level, a pair of rooms 20 defining a second floor level, an attic 22, and a space 17 below the basement floor.

A passive solar heating system is integrated into the building design illustrated in a greenhouse or solarium 24 exposed directly to the sun through south facing walls or windows 26. Other forms of passive solar buildings may, of course, be employed. In the illustrated building 10 open flooring or gratings 28 or the like is provided for the solarium 24, in order that the air space therein communicates both with the sub-basement space level 17 and an upper space 32 extending above the second floor level and communicating with the attic 22. Solarium 24 is thus an integral part of a flow path by which air may be circulated throughout the house. As indicated by arrows 34 in FIG. 1A, that flow path includes the solarium 24, the upper space 32, an interior passageway 36 through the north wall 38 of house 10, and the sub-basement space level 17. Together, these regions define a continuous thermal envelope 40 through which air may be circulated for space heating or cooling of house 10.

An internal blower system 42 is preferably, although not necessarily, provided within house 10 for the circulation of heated or cooled air therethrough. It is particularly desirable when convection flow induced by solar energy does not impart sufficient air flow or when it is desired to improve the temperature of the living space. The blower incorporates an output section 44 (see FIG. 2) connecting with an outlet duct 46 communicating with the rooms 18 and 20 through vents 48 and with outlet duct 45 communicating with solarium. Damper valves 47 and 49 are also provided in ducts 45 and 46, respectively, for regulating air flow therethrough.

In the preferred embodiment in which a blower system is employed, the blower system further preferably includes an input section 50 (see FIG. 2) connected by a duct 52 to the air space within solarium 24, by conduits 54 and 56 to the heat storage system 12 and cold storage system 14, respectively, and by an inlet port 58 to conduit 60 adapted to communicate with either of the heat or cold storage systems. Conduit 60 is, in turn, connected to rooms 18 and 20 through ducts 62, to solarium 24 through duct 64 and sub-basement space volume 17, and directly with the respective heat and cold storage systems. Damper valves 66–75 are provided in conduits 52, 54, 56, 60, 64 and 47, respectively, for control of the air flow through the various heating and cooling operating modes which may be employed. An auxiliary furnace 43 (FIG. 3) may also be associated with blower system 42, if desired, to provide supplemental heating capacity.

II

Design of the Passive Solar Heat Storage System

Referring now to FIG. 1A, heat storage system 12 comprises a high temperature collector 76 for collecting warm summer air and, during sunlit hours for heating that air whose thermal energy is to be stored. Heat storage system 12 also includes an underground heat storage reservoir 78, an inlet conduit 80 connecting reservoir 78 with the collector 76, and a solar chimney 82 for inducing air circulation into and through reservoir 78. Outlet means (comprising conduits 54 and 60) for transferring heat from reservoir 78 to house 10, and control means isolating the heat storage reservoir, first to accumulate heat and, thereafter, to transfer the heat are further provided for successively and sequentially isolating the heat storage reservoir, first to accumulate heat from the warm (and heated) summer air and, thereafter, during winter to transfer that stored heat to the air in the house 10 to effect space heating of the house.

The solar collector 76 may be of any design. As shown, collector 76 includes a heat collecting box incorporating a heating plate 84 and a pair of flapper valves 86 for preventing reverse air flow through the reservoir when operating on its heat storage cycle. As indicated hereinafter, air received within collector 76 is further heated during sunlight periods by impacting sunlight to as much as 50°–100° F. (or even more) in excess of ambient temperatures in much the same manner as the air in an automobile gets much hotter than ambient air on a sunny summer day.

Since the earth is a very poor thermal conductor it is not necessary to thermally insulate reservoir 78 from the remainder of the earth, thermal energy dissipating very slowly therefrom. Desirably, although not necessarily, however, and as shown in the drawing, the heat storage reservoir 78 is provided with insulation 88 that is not adversely affected by long time burial in the ground, such as polyurethane foam, to further minimize heat loss therefrom. Insulating layer 88 may entirely envelop the underground reservoir as illustrated, or embrace only a portion thereof, as desired.

As shown in FIGS. 1A, 4 and 5, the heat transfer reservoir 78 incorporates a plurality of horizontal manifold ducts 89 and vertical ducts 90 defining a flow path for heated air passed therethrough and providing effective heat transfer from and to the earth itself. For economic reasons, as well as to facilitate long-term, maintenance-free operation, the conduits may comprise plastic, ceramic or other composition pipe rather than metal ducts. If metal pipe is preferred, as for economic reasons, it should be treated to resist corrosion. Thus, aluminum pipe should be anodized or otherwise protected and steel pipe should be galvanized or otherwise protected. To improve the heat transfer characteristics thereof, ducts 89 and 90 are suitably provided with internal axially extending thermally conductive fins 91, preferably mounted on heat transfer rods or tubes 93 which extend outwardly through the walls of the ducts 89 and 90 and are embedded within the earth to improve heat transfer from and to the conduits. As shown in FIG. 5, rods 93 may have thermally conductive strips or plates 95 welded or otherwise secured thereto at their outer ends to further improve heat transfer and exchange between the air flowing through ducts 89 and 90 and the earth comprising heat storage reservoir 78. Fins 91, rods 93 and strips 95 may comprise aluminum or a similar heat conductive material. In lieu of rods and fins, planar continuous or semicontinuous strips may serve as heat transfer fins. The design of ducts 89 and 90 is thus chosen with a view to obtaining maximum heat transfer between the air passed therethrough and the earth constituting the bulk of the volume of heat storage reservoir 78.

Solar chimney 82 connects conduits 90 of the heat storage reservoir 78 with the atmosphere, and provides an efficient means for inducing natural convection currents for drawing air heated within the collector 76 into and through the reservoir without consumption of energy from conventional sources. Solar chimney 82 may be of any design that will impart substantial upward draft to force the passive flow of air from the collector through the reservoir and thence upwardly through the chimney. Thus, if desired, the chimney may be a plain, black pipe of sufficient height to create the necessary updraft. To enhance the draft created by the chimney, a conventional wind controlled ventilator 94 may be placed at the top.

Preferably the chimney 82 is of the construction shown in the cross-section in FIG. 6. In such structure, a box-like support 101 extends from above the damper 128 to the top. That box-like structure 101 may be made of metal, or wood. The structure, however, is opened at the south face for reasons which will become apparent hereinafter. The three surfaces of the box-like structure 101 are preferably lined with a suitable insulator, such as, for example, polyurethane foam, fiberglass, batting or the like. Within the balance of the structure, one or more black pipes or tubes 105 are included which pipes or tubes are preferably made of material of good thermal conductivity such as metal.

As shown in FIG. 6, there are two such pipes or tubes 105 and these pipes or tubes are coated with a dark metal coating such as a flat, black paint.

Overlying the opened surface of the box-like structure is glazing in the form of a transparent sheet such as glass, clear plastic or the like. The glazing, which is on the south-facing surface of the chimney, permits the solar rays to penetrate the chimney where they are absorbed by the black top tubes to heat the air within the tubes 105. Re-radiation of heat from the tubes back into the atmosphere is sharply curtailed by the glazing 111 which functions in the manner of glass in a greenhouse. Thus, the chimney is highly efficient in its energy absorption and conversion to heating the air within the tubes 105 to cause the required updraft. If desired, at the top of the chimney structure a plenum may be provided with a ventilator 94 overlying the plenum.

The height of the solar chimney is chosen, dependent in part upon the climatic conditions and situs of the particular installation, and the magnitude of the thermal draft necessary to induce effective passive or solar induced air circulation through the particular heat storage reservoir utilized. The air draft produced by the solar chimney 82 may be increased by the provision of a wind-operated ventilator 94 at the top of chimney 82. As will be noted in greater detail, the draft may be further assisted by a blower or fan. A flapper valve 96 is also provided adjacent the upper extremity of the solar chimney to insure one-way flow of air therethrough.

The collector 76, inlet conduit 80, heat storage reservoir 78, and solar chimney 82 thus define an open flow system through which air flow is induced to provide effective heat transfer to reservoir 78. The volume of the solar chimney relative to the air flow path through reservoir 78 and the collector 76 is such that sufficient thermal expansion occurs within the chimney to induce a substantial air flow rate through heat storage system 12, from the collector to the chimney. Where, however, for a particular application a sufficient flow rate is not produced, the passive system may be further augmented by a fan system indicated generally at 98. The fan (blower) may be located within the chimney to assist the tendency toward normal upward convection flow or it may be connected in parallel with the solar chimney 82 through ducts 100 and 102 to define a similar open flow system. Alternatively, fan system 98 may be of the recirculating type, operating through ducts 100 and 104 to define a closed loop system between collector 76, heat reservoir 78 and the solar chimney 82, in which event heat stored in the air and not given up to the earth during a pass through the reservoir will be available during succeeding passes. A hybrid system in which fan 98 operates both across the solar chimney through ducts 100 and 102, and by recirculation through ducts 100 and 104 to collector 76, may also be utilized. Thus, when it is desired to augment or replace the passive air induction system provided by solar chimney 82, any conventional fan or blower system may be utilized as aforesaid. It will be obvious that during night time hours there will be little or no passive convection flow since the air in the chimney will be at the same temperature as the air in the collector. However, it is generally not necessary or desirable to circulate air through reservoir 78 at night when there can be no sunlight heating of the air in the collector 76. During a summer night, the heat storage system will often be quiescent.

Conduits 54 and 60 which communicate wih the internal space heating and cooling system of house 10 are connected to conduits 90 within the heat storage reservoir 78. These conduits thus provide an outlet means through which an air stream is circulated to effect the transfer of thermal energy between reservoir 78 and house 10.

Damper valves 67, 68 and 71, 72 in the outlet conduits 54 and 60, respectively, provide control means for thermally isolating the heat storage reservoir 78 from house 10 during the summer season throughout which heat is accumulated within the reservoir. Damper valves 106, 107 and 108, 109 are also provided between inlet conduits 80 and the heat storage reservoir 78, and between the reservoir and the solar chimney 82, respectively, to define further control means for isolating the reservoir from the collector 76 and the solar chimney 82 (and hence from the atmosphere). The respective dampers may be manual, or switch controlled, or they may be operated by thermostatically controlled solenoids or the like, responsive to variations in temperature within house 10, as more fully described hereinafter. When, for example, dampers 106-109 are closed and dampers 67, 68, 71 and 72 are opened during the winter heating season, the system is conditioned for heat exchange and transfer between the heat storage reservoir 78 and house 10.

III

Design of the Passive Cold Storage System

Referring now to FIG. 1B, the cold storage system 14 comprises a low-temperature collector 110 for collecting cold air for storage of the thermal energy thereof, an underground cold storage reservoir 112, an inlet conduit 114 connecting reservoir 112 with collector 110, and a second solar chimney 82 for inducing air circulation into and through reservoir 112. Outlet means (comprising conduits 56 and 60) for effecting heat exchange between reservoir 112 and house 10, and control means (comprising a number of damper valves) are further provided for successively and sequentially isolating the cold storage reservoir, first to accumulate low temperature thermal energy (hereafter sometimes "cold") therein and, thereafter, to transfer cold from the reservoir into house 10 to effect space cooling of the former during the summer months.

The low temperature solar collector 110 be of any design, e.g., in the form of a cold air collecting box, the box is preferably insulative and reflective, either by being bright and shiny or by being coated with relective material such as white or aluminum paint. This is particularly true of a reflector 116 which overlies a receiver 118 that receives the cold, ambient winter air. The reflector 116 reflects the solar rays which would otherwise impinge thereon and increase the temperature of the air within the collector.

Cold storage reservoir 112 may be of any suitable design, but is preferably of the design already described hereinabove in connection with the heat storage reservoir 78. As described with heat storage reservoir 78, the cold storage reservoir incorporates internal conduits 89 and 90 defining a flow path for the air circulated therethrough to effect heat transfer with the earth storage zone. As in the case of heat storage reservoir 78, the cold storage reservoir 112 may be thermally insulated at 88, and the conduits 89 amd 90 may incorporate internal conductive sheets or plates to impart improved thermal conductivity characteristics thereto. Preferably, conduits 89 and 90 are constructed in accordance with FIGS. 4 and 5. Again, the design of the internal heat transfer conduits, the array of such conduits within the reservoir, the overall configuration and the external insulation of the reservoir (if any) are chosen with a view to obtaining maximum heat transfer between the air passed through conduits 90 and the cold storage reservoir 112, during both the thermal charging and discharging operations described hereinafter.

The cold storage reservoir 112 (as well as heat storage reservoir 78) may be conveniently constructed concurrently with construction of the foundation and/or the cellar of house 10. Thus, excavations for the reservoir(s) are dug along with the digging of the cellar, the internal ductwork and connecting conduits are put in place, and the earth thereafter bulldozed to cover the reservoirs prior to any landscaping and screening the areas around the collector(s). Depending on the material chosen, insulating layers 88 may be layed in or poured in place as part of the same installation. The size of the reservoir(s) and the collector(s), as well as the solar chimney discussed hereinafter, are functions of the particular climatic conditions encountered, the size of the building to be heated and/or cooled, etc. As already indicated, while circulation of air through the reservoirs can be performed by fans or blowers, it is preferred that the circulation be at least partially passively induced as convection, and most preferably be entirely passive to induce passive convective air flow through the reservoirs and solar chimney 82. Solar chimney 82, like the chimney described in connection with the heat storage system 12, is designed to induce natural convection currents for drawing winter cold air dropped into collector 110 into and through the cold storage reservoir 112. The solar chimney may be of the same basic design as that described hereinabove, incorporating an elongated, thermally conductive thin-walled preferably black tube 92 for absorbing winter solar radiation to heat and effect thermal expansion of the column of air contained therein. Chimney 82 may additionally incorporate a wind-operated ventilator 94 to increase the air draft produced thereby. Under most temperate climatic conditions, the provision of a tall solar chimney is particularly effective in producing substantial thermal expansion and inducing strong updrafts which create a natural convection current drawing cold air from collector 110, through inlet 114, and into and through cold storage reservoir 112 to produce heat exchange therewith.

It is also quite feasible, if desired, to further augment the passive circulation induced by solar chimney 82 by providing a fan 120 disposed within or connected in parallel with the chimney through ducts 122 and 124. Such an auxiliary fan increases the natural circulation produced by the passive, open flow system, where desired for specific installations. Alternatively but less desirably, as already noted, air circulation through the cold storage reservoir 112 can be induced wholly by a fan or blower, although this is less energy efficient than the other alternatives.

Conduits 56 and 60, which are connected with the internal space heating and cooling system of house 10, are connected to conduits 90 within cold storage reservoir 112. Conduits 56 and 60 thus provide an outlet means through which air is circulated to reservoir 112 for cooling and subsequent return to the house. [Technically it is of course more accurate to say that the hot air from the house is circulated to the reservoir where its excess thermal energy is transferred to the ground whereby to pump excess heat from house 10 to reservoir 112.]

Damper valves 69, 70 and 73, 74 in conduits 56 and 60 provide control means for thermally isolating the cold storage reservoir 112 from house 10 during the winter season, throughout which low temperature thermal energy (cold) is accumulated within the reservoir. Dampers 126 and 128 are also provided between inlet conduit 114 and the cold storage reservoir 112, and between the reservoir and the solar chimney 82, respectively, to define further control means for isolating the reservoir from the low temperature collector 110 and the solar chimney 82 (and hence from the atmosphere) during the succeeding summer season during which the "stored cold" is supplied to the house for cooling purposes. The respective dampers may be manually operated or switch controlled but, preferably, are operated by thermostatically controlled solenoids or the like, responsive to variations in temperature within house 10, as more fully described hereinafter. Thus, when valves 126 and 128 are closed and valves 69, 70 and 73, 74 are opened during the summer cooling season, the system is conditioned to permit heat exchange between the cold storage reservoir 112 and the living space within house 10.

IV

Operation of the Solar Heating System

A. Operation of the Heat Storage System

Operation of the heat storage system 12 is effected by initially thermally charging the heat storage reservoir 78 during the summer season when the ambient temperature is about 60° F. or higher. During this period solar radiation may increase the temperature of heating plate 84 within collector 76 possibly to hundreds of degrees F., correspondingly increasing the temperature of the air within the heat collecting box defined by the collector. To permit heat exchange with the thus heated air, preferably damper valves 67, 68 and 71, 72 in conduits 54 and 60 are closed, and valves 106, 107 and 108, 109 connecting heat storage reservoir 78 with collector 76 and the solar chimney 82, respectively, are open. The valves may be operated manually or by conventional motor means such as solenoids. The solenoids may be controlled in whole or in part by thermostats, manual switches or by a programmable microprocessor. With the damper valves in the condition as above described, the reservoir is isolated from the house during the heat storage part of the cycle. This is normally preferred. However, there may be times when it might be desirable to collect heat in the house and circulate the excess to the storage reservoir, particularly on a warm, sunny winter day, for example. Such operation comes within the purview of this invention and it is not intended in any way to be excluded. At the same time radiation heating of the solar chimney 82 effects thermal expansion of the long column of air within the chimney, producing an updraft therein which creates a pressure drop within reservoir 78. The pressure differential "pulls down" air heated within collector 76 into the reservoir, which in turn induces the flow of ambient air into the collector to continue the process. There is thus produced a natural convection current which circulates the hot air from collector 76, through the inlet conduit 80 and down into and through the heat storage reservoir 78, prior to being returned to the atmosphere upwardly through the solar chimney. As indicated, the draft thus created pulls more ambient air through flapper valves 86 into collector 76, continuing the process throughout the sunlit day. During the night, with no sunlight, the heat storage system will automatically shut down, unless assisted by a blower or by wind as noted below.

The updraft produced by the solar chimney is preferably augmented by the operation of the wind-operated ventilator 94 mounted thereon. In addition fan system 98 may be provided to further increase the desired circulation, e.g., during very still, hot days when there is little wind effect and thermal expansion through the solar chimney is not sufficiently greater than the thermal expansion effect at collector 76 to provide an adequate natural convection current from the collector through the reservoir. As indicated hereinabove, when the auxiliary fan system 98 is thus employed it may operate through ducts 100 and 102 as part of an open circulation system, through ducts 100 and 104 to define a closed circulation system between the solar chimney and the high temperature collector, or through ducts 100, 102 and 104 as part of a hybrid circulating system. Again, as noted, circulation may be wholly induced by fan or blower without departing from this invention. However, this is not preferred.

The heated air stream thus passed through heat storage reservoir 78 gradually raises the temperature of the reservoir to charge the reservoir with heat. This charging operation may take place over the entire summer period, i.e., during the period from March to October depending upon the climatic conditions at the particular installation.

Preferably, and for most efficient operation, valves or dampers 106 and 108 are opened only when the air temperature within collector 76 exceeds the air temperature within heat storage reservoir 78 by some predetermined value, i.e., referring to FIG. 1A, when $T_1$ is greater than $T_{HS}$ by some predetermined value. For example, if $T_1$ decreases below $T_{HS}$ in the late afternoon or evening the valves 106 and 108 are closed, preventing reverse heat flow to the atmosphere. If desired, temperatures $T_1$ and $T_{HS}$ may be sensed by thermostats which actuate suitable control mechanisms that automatically operate dampers 106 and 108. Similarly, flapper valve 106 prevents hot air from escaping outwardly from reservoir 78 through collector 76, and flapper valve 109 precludes a downdraft from solar chimney 82 from entering reservoir 78.

After the reservoir is sufficiently charged, preferably so that above 100° F. air can be delivered to the house during the entire heating season, it may be utilized for winter space heating of house 10. This temperature will depend on the design of the house 10 and heat storage reservoir. In such an instance, during the heating season, valves 106–109 are closed, and valves 67, 68 and 71, 72 in conduits 54 and 60 will be opened to permit heat exchange with the living space within house 10, as indicated hereinafter.

B. The Normal Passive Solar Heating Mode

While the particular thermal load forms no part of this invention by itself, as indicated a preferred load is passive solar house 10. When the temmperature ($T_R$ in FIG. 1A) within the living space in house 10 is at the "comfort level" (e.g., within the range of from about 60° F. to 75° F., depending upon the time of day and time of the year) the house blower system 42 is off and valves 47, 49, 58 and 75 into outlet ducts 46 and 64 connecting the blower system with the house living space, are closed. Similarly, as indicated hereinabove damper valves 67 and 68 in conduit 54, and dampers 71 and 72 in conduit 60 leading from the heat storage reservoir 78 are preferably closed. In this manner heat transfer from the heat storage reservoir into house 10 is precluded. Finally, damper valves 69 and 70 in conduit 56, and valves 73 and 74 in conduit 60, leading to the cold storage reservoir 112 are also preferably closed. Heat transfer from house 10 into the cold storage reservoir is thus also precluded.

Natural circulation through the thermal envelope 40 of house 10 is thus obtained, solar energy passively obtained within solarium 24 being conveyed naturally by convection upwardly to upper space 32, and thence downward through interior passageway 36 and then through sub-basement space level 17 back into the living space of the house 10. Other than passive solar heating and air circulation produced within solarium 24, preferably no active means for heating or cooling house 10 are employed in this mode of operation. If there is excess heat in the circulating air, that heat will be given up to the walls, floor, fixtures and earth in the sub-basement for short term storage to heat the air as it circulates during the evening. This of course is common to most prior art passive solar houses although the basement reservoir may be more elaborate in such prior art structures.

C. Solar Heating Using the Solarium-Blower System

When the temperature $T_R$ within rooms 18 and 20 dips below the comfort level and the temperature in the solarium ($T_S$ in FIG. 1A) nevertheless exceeds the comfort level by a predetermined differential, the blower system 42 is activated to circulate the warmer air from the solarium directly to rooms 18 and 20 defining the house living space. For this purpose damper 66 in duct 52, damper 49 in duct 46 and damper 75 opening into conduit 64, are opened. The opening of the dampers or valves may be achieved by the operation of solenoids coupled to the respective dampers. In turn, the solenoids may be operated by a power unit which is activated, for example, by thermometer when $T_R$ and $T_S$ are at the levels above noted. The air heated by solar radiation within solarium 24 is thus drawn through duct 52 into blower system 42, from whence the heated air is circulated through rooms 18 and 20. Air removed from rooms 18 and 20 through ducts 62 flows into conduit 60 and thence through conduit 64 into the sub-basement space volume 17 (where it mixes with air passing through thermal envelope 40), and is recycled to solarium 24. The temperature in the basement may be somewhat elevated due to its storage effect, as above noted. The blower system 42 thus effects active circulation between the passive-solar heated solarium and rooms 18 and 20, responsive preferably to thermostatic controls sensing the differential temperatures therein.

D. Solar Heating Using the Heat Storage-Blower System

When the temperature in rooms 18 and 20 is below the comfort level, and the solarium temperature is not sufficiently above that level to provide sufficient heat by itself to raise the temperature in rooms 18 and 20 back into the comfort range, as indicated by suitable temperature sensing means in the two locations, it is necessary to draw heat from the heat storage system 12 to maintain the living space within house 10 at comfortable temperature levels. For this purpose valves or dampers 67 and 68 in conduit 54, and valves or dampers 71 and 72 in conduit 60, connected to the heat storage reservoir are opened. At the same time valves or dampers 49 in duct 46 is opened and blower system 42 is activated. The blower thus circulates air into and through rooms 18 and 20, the air being exhausted therefrom through ducts 62, passing through conduit 60, and flowing through heat storage reservoir 78 where it is heated. The thus heated air is recirculated to house 10 through conduit 54, whence it is fed by blower system 42 back into rooms 18 and 20 to increase the temperature therein to maintain the desired comfort level.

If it is desired to utilize both the solar energy collected in solarium 24 and that stored in heat storage reservoir 78 for space heating, damper 66 in duct 52 and damper 75 in duct 64 may be opened in addition to dampers 67, 68, 71, 72 and 49. In this manner, both heated air removed from solarium 24 and that produced by heat exchange within heat storage reservoir 78 are pumped into and through rooms 18 and 20 defining the living space within house 10. The use of these alternative systems, either alone or in combination, may be automatically actuated, depending upon the heat loads, by a preprogrammed circuit controller operating in response to thermostats located in the solarium and in rooms 18 and 20, which in turn will energize solenoids or other motor means controlling the valves or dampers. If desired, the entire operation may be controlled through the means of logic circuitry such as, for example, a microprocessor. Alternatively, additional heat may be fed to the system through duct 46 from auxiliary furnace 43, or electric heating, as desired. The auxiliary furnace may be utilized in conjunction with either or both of the two heating systems described herein. If it is also desired to heat the solarium space, dampers 47 and 75 are additionally opened and blower system will pump air from heat reservoir through the solarium and back to heat reservoir, thus delivering heat to solarium.

V

Operation of the Solar Cooling System

A. Operation of the Cold Storage System

Operation of the cold storage system 14 is analogous to the operation of heat storage system 12, described hereinabove. Thus, during the winter season cold air is dropped into the low temperature collector 110, from which it flows into and through cold storage reservoir 112 (wherein it charges the reservoir with "cold"), and is drawn back into the atmosphere through the solar chimney 82. This procedure is initiated by opening valve or damper 126 in inlet conduit 114, and valve 128 intermediate the cold storage reservoir and the solar chimney, under conditions in which natural air circulation is induced from the collector to the solar chimney as by sunlight impinging on the solar chimney to cause an updraft. At the same time valves or dampers 70 and 74 in conduits 56 and 60 are closed to preclude premature heat exchange between reservoir 112 and house 10 prior to use for summer space cooling.

As previously described, such circulation may be initiated by thermal expansion of the tall column of air within chimney 82 upon solar heating thereof. In addition, excellent flow may be induced, even during cold winter nights, by the further action of wind-operated ventilator 94 on chimney 82.

After prolonged heat exchange with the cold air flow, the earth in reservoir 112 is cooled to its lowest value, e.g., to temperatures which may vary from as low as $-20°$ to as much as $40°$ F., depending upon the situs of the particular installation. Where the reservoir is so designed as to have an appreciable water content, freezing of the ground water with consequent dissipation of the latent heat of fusion will impart yet greater cooling capacity to the cold storage reservoir.

When the ambient atmospheric temperature exceeds the temperature within cold storage reservoir 112, valves or dampers 126 and 128 are closed to isolate the reservoir from the atmosphere. Thereafter, when it is desired to employ the reservoir for space cooling during the summer season, valves or dampers 70 and 74 in conduits 56 and 60 are opened to facilitate heat exchange with the living space within house 10 as described below.

B. Normal Passive Solar Cooling Mode

When, during the summer season, the room temperature $T_R$ within rooms 18 and 20 of house 10 is within the comfort range the living space within the house may be isolated from both the passive-solar heating means within solarium 24 and the cold storage reservoir 112 merely by closing dampers 49, 66, 69, 70, 73, 74, 58 and 75, respectively. Passive flow through thermal envelope 40 is thus obtained in the same manner as previously described in connection with the Normal Passive Solar Heating Mode of operation. Alternatively, with windows or outside doors open the air heated in solarium 24 can be vented out through space 22 by opening the damper between space 34 and space 22 to prevent the recirculation of the heated air. This will cause a draft which will impart some cooling to occupants.

C. Solar Cooling Using Cold Storage-Blower System

When temperature detection means detect uncomfortably high temperatures in $T_R$ in rooms 18 and 20 of the house 10, advantage of the "cold" stored in the cold storage reservoir may be taken to reduce that temperature to the comfort level. As will be seen hereinafter, additional steps may be taken to cool down the temperature in the solarium as well. To reduce the temperature in the room 18 and 20 within the air circulation envelope defined by the solarium, space 32, space 34 and the space within the basement, first dampers 126 and 128 connecting the cold storage reservoir respectively to the cold air collector 110 and the cold air chimney 82 are closed to block passive circulation through the cold storage reservoir. This action is done on a more or less seasonal basis with the dampers 126 and 128 closed from April through September. Since dampers 126 and 128 are normally only operated once every six months, they may be manual. Alternatively, they may be motor operated, such as by solenoids, which in turn are controlled by manual switches within the house 10 or by some overriding circuit controller. Assuming the storage circuit for the cold storage reservoir is closed as described to permit circulation of the air from the house through the reservoir for cooling and then back to the house, the dampers 69, 70, 73 and 74 are opened to open the ducts 56 and 60 between the house and the reservoir, damper 49 between the blower system 42 and duct 46 is opened, and damper 58 between the blower system 40 and duct 60 is at least partially opened to permit cool air circulation from the duct 60 into the blower 42 and then through the inner portion of the house. Through the dampers operated to the described condition, when the blower is energized as would result by suitable temperature detection means activating a control mechanism upon sensing an over-temperature condition, hot air from the rooms 18 and 20 is exhausted through ducts 62 and into duct 60 where the air is transported to the cold storage reservoir for cooling. After passing through the cold storage reservoir, the air is gathered in the duct or conduit 112 and thence back through the conduit 56 past open dampers 69 and into the blower 42 which forces the cold air upwardly through duct 46 and out through the registers 48 into rooms 18 and 20 to cool those rooms.

While on the hottest days, it may be desirable to limit or even avoid use of the solarium in order to minimize overloading of the cold storage reservoir, when it is desired or necessary to cool the solarium, this may also be achieved by opening damper 66 and doors between rooms 18 and 20 and the solarium 24 in order to provide an additional return path for cold air through the solarium and through the duct 52. Alternatively, the doors may be kept closed and duct 47 may be opened to establish a supply path for cold air through duct 45. This would be particularly effective at night when the solarium receives no significant radiant heat and hence does not overload the entire system. Thus, during extreme hot spells, the major portion of the house, made up of the interior rooms 18 and 20, can be kept at a comfortable level without overloading the system by trying to cool the solarium. However, during evenings or during less intense hot periods, the solarium may be cooled as well. As is true with the operation of most of the dampers, the damper 66 may be automatically operated or may be operated by a manual switch controlling a solenoid or other motor means for opening or closing damper 66, or if desired, the damper 66 may be manually operated. Moreover, if desired, conventional air conditioning means may be incorporated within the system in a manner similar to the furnace means described above for supplementing the cold storage system during extreme hot temperature periods. Also, if it is desired to cool the solarium space only, dampers 47 and 75 may be opened, dampers 69, 70, 73 and 74 are open, and blower system will move cold air from the cold reservoir into the solarium and back. It is obvious that other combinations of these actions can be effected.

VI

System Design Capacity

As described hereinabove, use of the heat storage system 12 facilitates summer heat storage and winter heating, and use of the cold storage system 14 permits winter cold storage and summer cooling of the air space within house 10. Either system may be used alone or both may be used in conjunction to provide a substantially year-round heating and cooling system for house 10.

The efficacy of the passive solar energy storage system of the invention may be illustrated by the following calculations, based upon average daily solar radiation data for a situs at New York City (40° North latitude). Such radiation on a horizontal surface in B.T.U.'s per day per square foot is as follows:

| January | 540 | July | 1938 |
| February | 790 | August | 1605 |
| March | 1180 | September | 1349 |
| April | 1426 | October | 977 |
| May | 1738 | November | 598 |
| June | 1994 | December | 476 |

Assuming that the heat storage reservoir 78 is charged with thermal energy over the period from March through September, the potential heat input to the reservoir per square foot of the area of high temperature collector 76 may be calculated as follows:

| March | (1180)(31) = | 36,580 B.T.U.'s |
| April | (1426)(30) = | 42,780 B.T.U.'s |
| May | (1738)(31) = | 53,878 B.T.U.'s |
| June | (1994)(30) = | 59,820 B.T.U.'s |
| July | (1938)(31) = | 60,078 B.T.U.'s |
| August | (1605)(31) = | 49,755 B.T.U.'s |
| September | (1349)(30) = | 40,470 |
| | | 343,361 B.T.U.'s |

Assuming only a 33⅓% efficiency of thermal energy storage, a square foot of collector surface would still be capable of collecting some 114,453 B.T.U.'s of storable energy over the long-term summer season. Assuming further the recovery of about 80,000 B.T.U.'s of thermal energy from a gallon of fuel oil, each square foot of collector surface could store thermal energy over the summer season equivalent to 1.43 gallons of heating oil.

Assuming the specific heat of the earth is about 0.32 BTU/lb./° F. and further assuming that the heat or cold storage reservoir occupies 1,000 sq. ft. of land area and is 10 feet deep, then it can be shown that such a reservoir will store 352,000 BTU's for each degree F. of temperature rise (or fall) above (or below) the comfort level (1,000×10×110 lb./ft. ×0.32 BTU/lb./F.×1). Assuming 33⅓% efficiency for the collector, it will be apparent for a reservoir of 10,000 cubic feet that a 3 sq. ft. collector would be effective to raise the reservoir temperature 1° F. over the heating season. To elevate the entire heat storage reservoir 50° F. a collector of about 150 sq. ft. is required for a 10,000 cubic foot reservoir assuming 100% efficiency of heat exchange between the air and the reservoir during the storage cycle. The actual efficiency of heat exchange between the circulating air and the reservoir is currently unknown. Clearly, when known, to design an appropriately sized collector for a 10,000 ft. reservoir, it will be necessary to divide 150 ft. by that efficiency figure. Given this analytical approach, for any house in any particular region, the amount of seasonal thermal demand for both heating and cooling is well known. Given that demand, it will be a routine matter to calculate the size of a reservoir suitable to heat or cool the house throughout substantially the entire heating or cooling season.

As indicated hereinabove, the technique of the invention may also be utilized for hot water heating, for refrigeration, or for operating a heat engine to do useful work or generate electricity. Accordingly, it should be understood that the preceding description of preferred embodiments of the present invention is given as illustrative only, and that the scope of the invention is not limited other than as defined in the claims appended hereto.

While it will be recognized that central to applicant's invention is the recognition that solar energy can be stored on a long term basis, especially on a seasonal basis, for use on a long term basis as during an ensuing season, that the ideal storage medium for such long term thermal reservoir is the earth itself and that an economical working fluid for transferring solar energy from the sun to the reservoir and from the reservoir to the thermal load is air, it should be recognized that the scope of this invention does not exclude the short term use of solar energy collected by a collector and transferred directly to the load, e.g. the house 10 without storage in the reservoir. Such use may be especially advantageous on a sunny day in the winter time wherein the air in the high temperature collector 76 can become extremely hot from the sun's rays impinging directly on the collector. Under such conditions, it may be desirable to operate the damper 106 to open the connection between the collector and the reservoir whereby to permit the hot air into the collector to be drawn down in the reservoir and thence through duct 60 and into the house. This short term direct use of high temperature solar energy collected during the winter can provide a significant amount of high temperature energy to the house 10, whereby to reduce the thermal demand of the house 10 on the stored heat in the reservoir 12. This will enable the reservoir to be of smaller size than would be required if the system were operated without such direct use wherein all of the solar energy for the house 10 during the winter is energy stored during the summer. It is for this reason that some of the claims hereinafter presented specifically call for "at times" operating the storage loop and for "at other times" operating the heating loop to draw stored energy from the reservoir into the house during the corresponding heating or cooling season. This would enable the system to be operated as just above described without departing from the scope of these claims.

Despite the short term direct use of collected energy as from the high temperature collector 76 to the house 10, it will be apparent that most of the high temperature energy needed to heat the house 10 during the winter season in a temperature climate must be stored on a seasonal basis during the summer in the reservoir 12 and then pulled out of the reservoir during the winter months.

I claim:

1. A thermal storage system for storing solar energy for a long term period and for alternately supplying said stored energy to a thermal load which comprises:
    (a) a collector for collecting air acting as a carrier for thermal energy;
    (b) an underground thermal storage reservoir utilizing a portion of the earth as a medium to store thermal energy, said reservoir having a capacity sufficient to store thermal energy for a major part at least of the net energy requirement of said thermal load for an entire heating or cooling season;
    (c) inlet means connecting the thermal storage reservoir with the collector for transferring said air from said collector to said thermal storage reservoir;
    (d) passive means including solar chimney means for circulating said air from the collector and into and through the thermal storage reservoir,
    (e) outlet means for transferring stored thermal energy between the thermal storage reservoir and said thermal load; and
    (f) control means for at times isolating the thermal storage reservoir from the thermal load during a first heating or cooling season to accumulate thermal energy within the reservoir during that season, and for isolating the thermal storage reservoir from the collector at other times during a succeeding cooling or heating season, respectively, to facilitate the transfer of thermal energy between the reservoir and the desired thermal load during that latter named season.

2. The thermal storage system of claim 1 wherein said thermal load comprises a building, and said outlet means transfers said thermal energy by circulating air between the thermal storage reservoir and said building in order to effect the heating or cooling of said building.

3. The thermal storage system of claim 1 wherein said means for circulating air comprises at least in part a solar chimney connecting the thermal storage reservoir to the atmosphere.

4. The system for storing and utilizing solar energy of any of claims 1, 2 or 3 wherein the thermal storage reservoir is a heat storage reservoir, and in which the control means associated with the heat storage reservoir includes means for isolating the heat storage reservoir from the atmosphere when the temperature of the air within the collector associated therewith is less than the temperature in the heat storage reservoir, and for effecting communication between the heat storage reservoir and the atmosphere when the temperature of the air within said collector is more than the temperature in the heat storage reservoir.

5. The thermal storage system of claim 1 wherein said means for circulating air comprises a blower.

6. The thermal storage system of claim 1 wherein said means for circulating air comprises duct means defining a return path from said reservoir to said collector, and a blower for circulating the air from said collector to said reservoir, and through said reservoir back to said collector.

7. A system for storing and utilizing solar energy which comprises:
   (A) a building to be substantially heated by solar energy during the winter season and substantially cooled by solar energy during the summer season;
   (B) a passive solar heat storage system for storing high temperature solar energy during the summer season and for heating the building during the winter season, comprising:
      (i) a high temperature collector communicating with the atmosphere for collecting air and for heating said air therein by solar radiation;
      (ii) a heat storage reservoir in the earth having a capacity sufficient to store high temperature thermal energy during a major portion at least of the entire summer season;
      (iii) inlet means connecting the heat storage reservoir with the collector for transferring heated air from the collector to the reservoir to store heat at a high temperature therein;
      (iv) a solar chimney connected to the heat storage reservoir and extending into the atmosphere, said chimney being subject to solar heating to effect thermal expansion and convection of the air contained therein and thereby at least partially induce natural circulation of heated air from the collector, into and through the heat storage reservoir, and through the chimney back into the atmosphere, to thereby increase the temperature within the heat storage reservoir;
      (v) outlet means for conveying heated air from the heat storage reservoir into the building; and
      (vi) control means for isolating the heat storage reservoir from the building at times during the summer season to accumulate high temperature thermal energy within the reservoir during that season, and for isolating the heat storage reservoir from the high temperature collector and the solar chimney during the succeeding winter season to facilitate heating of the building during that season by air circulating through said outlet means between said heat storage reservoir and said building; and
   (C) a passive solar cold storage system for storing low temperature energy during the winter season and for cooling the building during the summer season, comprising:
      (i) a low temperature collector communicating with the atmosphere for collecting cold, ambient air;
      (ii) a cold storage reservoir in the earth having a capacity sufficient to store low temperature thermal energy during a major portion at least of the entire winter season;
      (iii) inlet means connecting the cold storage reservoir with the low temperature collector for transferring cold air from the collector to the reservoir to store heat at a low temperature therein;
      (iv) a solar chimney connected to the cold storage reservoir and extending into the atmosphere, said chimney being subject to solar heating to effect thermal expansion and convection of the air contained therein and thereby at least partially induce natural circulation of cold air from the low temperature collector, into and through the cold storage reservoir, and through the chimney back into the atmosphere, to thereby decrease the temperature within the cold storage reservoir;
      (v) outlet means for conveying cold air from the cold storage reservoir into the building; and
      (vi) control means for isolating the cold storage reservoir from the building at times during the winter season to accumulate low temperature thermal energy within the reservoir during that season, and for isolating the cold storage reservoir from the low temperature collector and the solar chimney at times during the succeeding summer season to facilitate cooling of the building during that period by air circulating through said outlet means between the cold storage reservoir and said building.

8. The system for storing and utilizing solar energy of claim 7 wherein each said solar chimney includes wind-operated ventilator means for increasing the flow of solar-heated air withdrawn therefrom to thereby induce increased flow of air through each said thermal storage reservoir and consequent heat transfer therewith.

9. A method for the storage and use of solar energy by a thermal load over long term periods which comprises:
   (a) introducing air from the atmosphere into a collection zone;
   (b) passively passing the air by use of solar chimney means from said collection zone into and through an underground thermal storage zone comprising a portion of the earth, said zone having a heat capacity sufficient to store thermal energy for the major part at least of an entire heating or cooling period;
   (c) during a first heating or cooling period, at times at least circulating an air stream into said collection zone, into and through said thermal storage zone, and outwardly from said thermal storage zone without passing through said thermal load, said stream effecting substantial heat exchange with said portion of the earth comprising said thermal storage zone during said first heating or cooling period; and
   (d) during the succeeding heating or cooling season, respectively, isolating said underground thermal storage zone from ambient atmosphere and flowing an air stream through said zone and through said thermal load to effect heating or cooling of said heat load.

10. The method of claim 9 wherein the step of circulating said air stream through said collection zone and said storage zone is induced at least in part by a solar energy induced convection.

11. The method of claim 9 wherein the induction of air flow into and through the thermal storage zone is effected at least in part by exposing an elongated column of air connecting the thermal storage zone with the atmosphere to solar heating to effect thermal expansion thereof with the consequent formation of a convection current inducing such flow.

12. The method for the storage and use of solar energy of either of claims 9, 10 or 11 wherein the thermal load is a building having living space therein, and wherein the cooling period is the summer season and the heating period in the winter season, and wherein warm air is introduced into said collection zone during the summer season while subjecting the air within said zone to solar radiation to further heat it when solar radiation irradiates said collection zone, passing the warm air into and through the underground thermal storage zone to increase the temperature of said thermal storage zone during the summer season and, during the succeeding winter season isolating said underground thermal storage zone from the atmosphere and circulating an air stream therethrough and into the living space of said building to effect heating thereof.

13. The method for the storage and use of solar energy of either of claims 9, 10 or 11 wherein said thermal load is a building having living space therein, and wherein cold air is introduced into said collection zone during the winter season passing the cold air into and through the underground thermal storage zone to decrease the temperature of said thermal storage zone during the winter season and, during the succeeding summer season isolating said underground thermal storage zone from the atmosphere and circulating an air stream therethrough and into the living space of said building to effect cooling thereof during the summer season.

14. The method for the passive storage and use of solar energy in a building having a living space, as set forth in claims 9, 10 or 11 wherein said long term periods are summer and winter, and wherein said method comprises the following steps in sequence:

(A) during the summer season:
  (i) introducing air into a first, high temperature collection zone while subjecting the air within said zone during sunlight periods to solar radiation to heat it to a temperature in excess of the ambient air temperature,
  (ii) passing the thus heated air into and through an underground heat storage zone to increase the temperature of said heat storage zone and, at the same time,
  (iii) circulating warm air from the living space of said building into and through an underground cold storage zone and back into said living space to effect cooling thereof; and (B) during the succeeding winter season:
  (i) introducing air into a low temperature collection zone while during sunlight periods reflecting solar rays from said low temperature collection zone to minimize radiation heating of said cold air,
  (ii) passing the cold air into and through said underground cold storage zone to decrease the temperature therein; and at the same time,
  (iii) circulating cold air from the living space of said building into and through said underground heat storage zone and back through said living space to effect the heating thereof.

15. A thermal storage system for storing solar energy for a long term period and for alternately supplying said stored energy to a thermal load which comprises:
  (a) a collector for collecting air acting as a carrier for thermal energy;
  (b) an underground thermal storage reservoir having a capacity sufficient to store thermal energy for a major part at least of the net energy requirement of said thermal load for an entire heating or cooling season;
  (c) inlet means connecting the thermal storage reservoir with the collector for transferring said air from said collector to said thermal storage reservoir;
  (d) means for circulating said air from the collector and into and through the thermal storage reservoir comprising at least in part a solar chimney connecting the thermal storage reservoir to the atmosphere;
  (e) outlet means for transferring stored thermal energy between the thermal storage reservoir and said thermal load; and
  (f) control means for at times isolating the thermal storage reservoir from the thermal load during a first heating or cooling season to accumulate thermal energy within the reservoir during that season, and for isolating the thermal storage reservoir from the collector at other times during a succeeding cooling or heating season, respectively, to facilitate the transfer of thermal energy between the reservoir and the desired thermal load during that latter named season.

16. A method for the storage and use of solar energy by a thermal load over long term periods which comprises:
  (a) introducing air from the atmosphere into a collection zone;
  (b) passing the air from said collection zone into and through an underground storage zone having a heat capacity sufficient to store thermal energy for the major part at least of an entire heating or cooling period;
  (c) during a first heating or cooling period, at times at least circulating an air stream into said collection zone, into and through said thermal storage zone at least in part by exposing an elongated column of air connecting the thermal storage zone with the atmosphere to solar heating, and outwardly from said thermal storage zone without passing through said thermal load, said stream affecting substantial heat exchange with the earth in said thermal storage zone during said first heating or cooling period; and
  (d) during the succeeding heating or cooling season, respectively, isolating said underground thermal storage zone from the ambient atmosphere and flowing an air stream through said zone and through said thermal load to affect heating or cooling of said heat load.

* * * * *